United States Patent  (10) Patent No.: US 10,703,222 B2
Perkins  (45) Date of Patent: Jul. 7, 2020

(54) ADJUSTABLE TRACTION BATTERY STATE OF CHARGE RANGE

(71) Applicant: Ford Global Technologies, LLC, Dearborn, MI (US)

(72) Inventor: William Paul Perkins, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/208,994

(22) Filed: Dec. 4, 2018

(65) Prior Publication Data

US 2020/0171973 A1  Jun. 4, 2020

(51) Int. Cl.
*B60L 58/12* (2019.01)
*B60L 53/14* (2019.01)
*B60L 53/22* (2019.01)

(52) U.S. Cl.
CPC ............ *B60L 58/12* (2019.02); *B60L 53/14* (2019.02); *B60L 53/22* (2019.02)

(58) Field of Classification Search
CPC .......... B60L 58/12; B60L 53/22; B60L 53/14
USPC ......................................................... 701/22
See application file for complete search history.

(56) References Cited

U.S. PATENT DOCUMENTS

| 2011/0190968 A1* | 8/2011 | Fleming ............... G06F 19/00 701/22 |
| 2014/0114514 A1 | 4/2014 | Crombez et al. |
| 2014/0167707 A1* | 6/2014 | Brunstetter ............ B60L 58/12 320/162 |
| 2014/0172206 A1 | 6/2014 | Roos et al. |
| 2015/0217756 A1* | 8/2015 | Kitabatake ............ B60W 10/06 701/22 |
| 2015/0307083 A1* | 10/2015 | Hisano ................ B60W 50/085 701/22 |
| 2016/0339903 A1 | 11/2016 | Llokoi |
| 2017/0306821 A1* | 10/2017 | Hashimoto ............... B60L 1/00 |

* cited by examiner

*Primary Examiner* — Behrang Badii
*Assistant Examiner* — Hossam M Abd El Latif
(74) *Attorney, Agent, or Firm* — David B. Kelley; Brooks Kushman P.C.

(57) ABSTRACT

A vehicle includes a traction battery, and a controller configured to, responsive to a transition from deplete mode to sustain mode during a first drive cycle, maintain a state of charge (SOC) of the battery within a range defined by a first maximum threshold, and responsive to initiation of a next drive cycle in the sustain mode, maintain the SOC within a range defined by a second maximum threshold greater than the first.

10 Claims, 7 Drawing Sheets

US 10,703,222 B2

ADJUSTABLE TRACTION BATTERY STATE OF CHARGE RANGE

TECHNICAL FIELD

The present disclosure relates to systems and methods for determining vehicle operating mode based on a traction battery state of charge value.

BACKGROUND

The term "hybrid vehicle" may be used to describe vehicles having one or more sources of propulsion power, such as an internal combustion engine and an electric motor. Examples of hybrid vehicles include hybrid electric vehicles (HEV) and plug-in hybrid electric vehicles (PHEV). An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

SUMMARY

A vehicle includes a traction battery, and a controller configured to, responsive to a transition from deplete mode to sustain mode during a first drive cycle, maintain a state of charge (SOC) of the battery within a range defined by a first maximum threshold, and responsive to initiation of a next drive cycle in the sustain mode, maintain the SOC within a range defined by a second maximum threshold greater than the first.

A method includes, by a controller, responsive to a transition from deplete mode to sustain mode during a first drive cycle, maintaining a state of charge (SOC) of the battery within a range defined by a first maximum threshold, and responsive to initiation of a next drive cycle in the sustain mode, maintaining the SOC within a range defined by a second maximum threshold greater than the first maximum threshold.

A system for a vehicle includes a traction battery, and a controller configured to, during a same drive cycle, transition from deplete mode to sustain mode responsive to a state of charge (SOC) of the battery falling below a first threshold, and maintain the SOC within a range defined by a maximum threshold greater than the first threshold during the sustain mode via selective charging of the battery.

DETAILED DESCRIPTION

Figure 1:
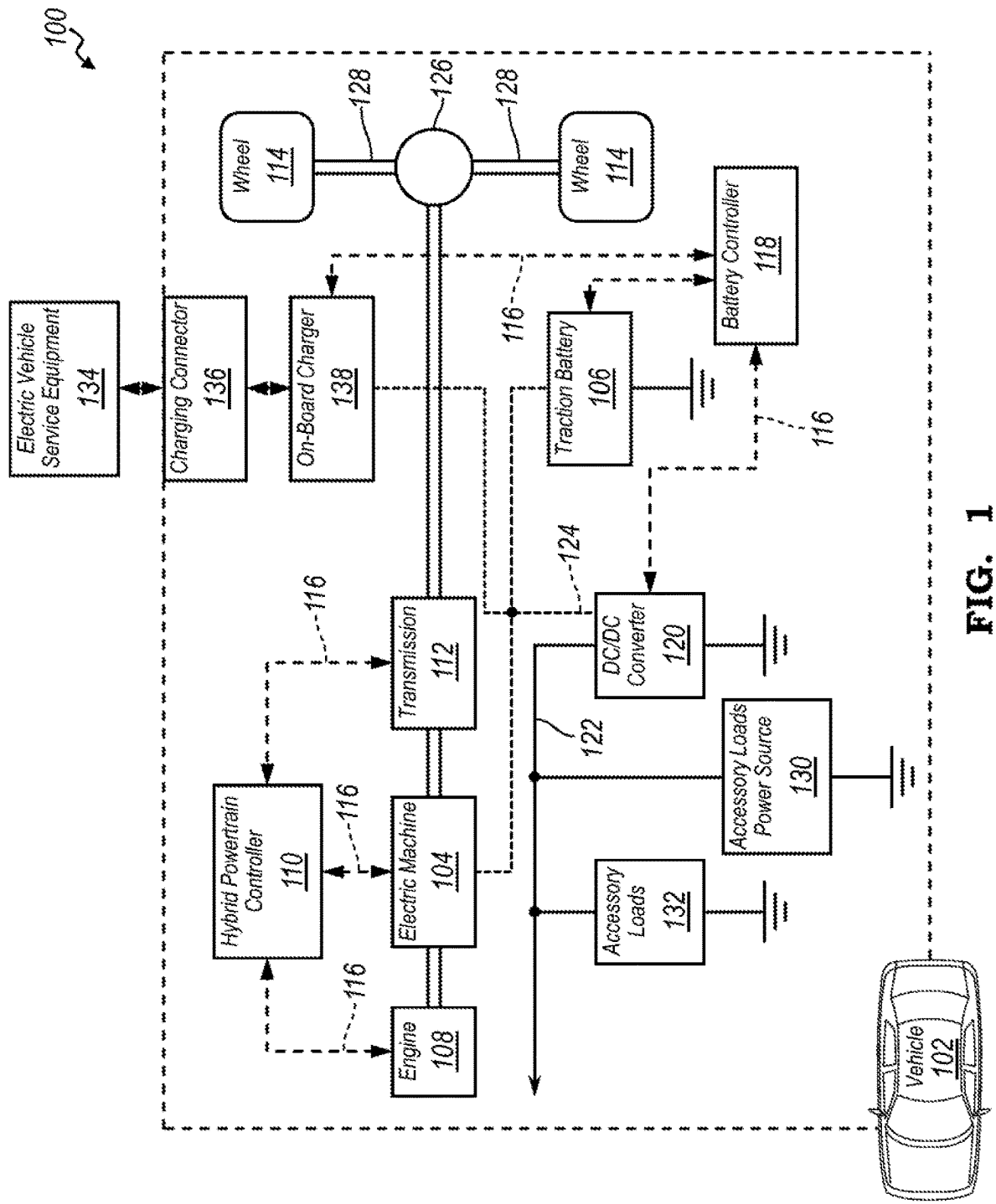
FIG. 1 is a block diagram of a plug-in hybrid electric vehicle (PHEV) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The plug-in hybrid vehicles may operate in one of charge depleting and charge sustaining modes. In one example, when the traction battery is at, or near, a full charge, the vehicle may operate in the charge depleting mode to maximize the number of all-electric miles driven. Further, during vehicle operation, battery state of charge (SOC) value may decrease from a value at, or near, full charge to a predefined threshold, e.g., 20%, at which point the vehicle may begin operating in the charge sustaining mode. Unlike during the charge depleting mode when the system maximizes the number of all-electric miles driven, the charge sustaining mode operation may include proving propulsion using primarily energy originating in components, other than the battery, such as, the engine, the electric motor, and so on.

Accordingly, the vehicle may operate in the charge depleting mode when the traction battery SOC is between an upper (maximum) depleting threshold and a lower (minimum) depleting threshold, where the upper and lower depleting thresholds define a depleting SOC range. Further, the vehicle may operate in the charge sustaining mode when the traction battery SOC is between an upper (maximum) sustaining threshold and a lower (minimum) sustaining threshold, where the upper and lower sustaining thresholds define a sustaining SOC range. In one example, the lower depleting threshold may be approximately equal to the upper sustaining threshold, such that, upon exiting the charge depleting mode, the vehicle may operate in the charge sustaining mode. In another example, the SOC ranges corresponding to each of the charge sustaining and depleting modes may overlap. Larger, smaller, or different SOC ranges and maxima and minima thresholds are also contemplated.

Upon entering the charge sustaining mode of operation, the vehicle may be configured to operate in the charge sustaining mode for duration of the ignition cycle and regardless of the traction battery SOC. Additionally or alternatively, the vehicle operating in the charge sustaining mode may prioritize maintaining battery SOC value within the sustaining SOC range. Further, entering the charge sustaining mode may cause the vehicle to maintain battery SOC within a predefined tolerance, or "swing," e.g., +/−1%, of the sustaining SOC range values. Accordingly, for the battery operating in an example sustaining SOC range between 16-20%, the upper sustaining threshold under the tolerance may not exceed 21% and/or the lower sustaining threshold under the tolerance may not fall below 15%.

One or more components of the vehicle may operate differently under each of the charge depleting and charge sustaining modes. For example, during the charge depleting mode, i.e., while battery SOC is greater than 20%, the traction battery may be configured to output a first maximum energy $E_{max\_CD}$, e.g., 6 kilowatt-hours (kW-hr), to meet propulsion and non-propulsion demands of the system, user acceleration, power, and torque demands, and so on. As another example, in response to entering the charge sustaining mode, i.e., when battery SOC falls below 20%, the traction battery may be configured to output a second maximum energy $E_{max\_CS}$, e.g., 0.4 kW-hr, less than the first maximum energy $E_{max\_CD}$. Battery energy output values given herein are merely examples and are not so limited. In some instances, one or both the first and second maximum energy $E_{max\_CD}$ and $E_{max\_CS}$ may vary due to vehicle operating conditions, user demands, and so on, such that the second maximum output energy $E_{max\_CS}$ is less than the first maximum output energy $E_{max\_CD}$.

A vehicle controller may be configured to selectively increase (or expand) battery SOC range during one or more operating conditions, such that the vehicle and the traction battery may operate in one of the charge depleting and sustaining modes for a longer period of time. In one example, the controller may be configured to expand the sustaining SOC range by increasing a value of the maximum sustaining threshold from a first maximum sustaining threshold, e.g., 20%, to a second maximum sustaining threshold, e.g., 22%, where the second maximum sustaining threshold is greater than the first. As another example, the controller may be configured to expand the sustaining SOC range increasing the tolerance from a first tolerance, e.g., +/−1%, to a second tolerance, e.g., +/−2.5%, where the second tolerance is greater than the first tolerance.

Since operating the vehicle in the charge sustaining mode for longer periods may reduce the number of all-electric miles driven by the vehicle and cause user dissatisfaction, the controller may be further configured to selectively decrease the charge sustaining SOC range by decreasing the maximum sustaining threshold from the second maximum sustaining threshold, e.g., 22%, to the first maximum sustaining threshold, e.g., 20%.

A battery controller may be configured to expand SOC range corresponding to the charge sustaining mode following a transition from the charge depleting mode to the charge sustaining mode when SOC of the battery falls below a predefined SOC threshold. In one example, a given vehicle may operate in the charge depleting mode when the SOC of the battery is between 95% and 20% and may operate in the charge sustaining mode when the SOC of the battery is less than 20%. In some instances, the controller may store a "mode-flag," e.g., a Boolean value, indicating, based on the battery SOC, whether the vehicle is operating in the charge depleting mode (Boolean 1) or the charge sustaining mode (Boolean 0).

In one example, at a first vehicle-on event, the detected SOC, $SOC_{first\_vehicle-on\_start}$ of the traction battery may be approximately 90% causing the controller to store the mode-flag value of Boolean 1 indicating that the vehicle is operating in the charge depleting mode. During a same vehicle-on event, the SOC may fall below 20%, such that the controller may then update the mode-flag value to Boolean 0 indicating that the vehicle is operating in the charge sustaining mode. At a vehicle-off event, the controller may store (or latch) the mode-flag value set according to the battery SOC, $SOC_{first\_vehicle-on\_end}$ during the vehicle key-off event.

During a next vehicle-on event, responsive to the battery SOC, $SOC_{first\_vehicle-on\_start}$ still being less than 20%, the controller may maintain the mode-flag value indicating that the vehicle continues to operate in the charge sustaining mode. Accordingly, the controller may then operate the vehicle in the charge sustaining mode, including maintaining the battery SOC within a range defined by the SOC, $SOC_{next\_vehicle-on\_start}$ detected at a time of the next vehicle-on event. In one example, the controller may be configured to maintain the battery SOC within a normal threshold of the SOC, $SOC_{next\_vehicle-on\_start}$ detected at a time of the next vehicle-on event, e.g., the detected initial SOC, $SOC_{next\_vehicle-on\_start}$+/−1%.

In another example, the controller may maintain the battery SOC within an expanded threshold of the SOC, $SOC_{next\_vehicle-on\_start}$ detected at a time of the next vehicle-on event, e.g., the detected initial SOC, $SOC_{next\_vehicle-on\_start}$+/−2.5%. In still another example, responsive to the detected initial SOC being approximately 20%, the controller may operate the vehicle in the charge sustaining mode, including maintain the SOC of the battery within a range between 17.5%-22.5%. In yet another example, responsive to the initial detected SOC, $SOC_{next\_vehicle-on\_start}$ being approximately 17.5%, the controller may operate the vehicle in the charge sustaining mode, including maintain the SOC within a range between 15-20%.

Under one or more operating conditions of the vehicle, the charge sustaining SOC ranges (e.g., normal ranges and expanded ranges) may be subject to an absolute minimum SOC threshold, $SOC_{min\_abs}$. For example, for the traction battery having the absolute minimum SOC threshold, $SOC_{min\_abs}$ equal to 15%, the controller may prevent the SOC from falling below 15% regardless of all other operating conditions of the vehicle, such as, user power and energy demands, and so on. Accordingly, responsive to the initial detected SOC, $SOC_{next\_vehicle-on\_start}$ being 15.5%, the controller may operate the vehicle in the charge sustaining mode including maintaining the SOC of the battery within a range between 15% and 20%.

Additionally or alternatively, the charge sustaining SOC range may be subject to one or more maximum SOC thresholds, $SOC_{max}$. In one example, during the charge sustaining mode, the controller may prevent (or limit) an engine from charge the traction battery a first maximum SOC threshold, $SOC_{max}$. In another example, during the charge sustaining mode, the controller may permit energy generated using regenerative braking, or using other propulsion or non-propulsion methods, to increase battery SOC to a value greater than the first maximum SOC threshold, $SOC_{max}$.

Other variations of battery SOC operating ranges, including, but not limited to, additional or different upper and lower, maxima and minima SOC thresholds and so on, are also contemplated. The absolute minimum SOC threshold, $SOC_{min}$ and one or more maximum thresholds, $SOC_{max}$ of a given traction battery may be established according to one or more of manufacturer requirements, battery cells chemistry, battery cell arrangement, and other specifications driven by system design, manufacturing, testing, or validation procedures and results, and so on.

As another example, at the next vehicle-on event, the controller may detect that the initial detected SOC, $SOC_{next\_vehicle\-on\_start}$ has increased by a predefined amount in comparison to the battery SOC, $SOC_{first\_vehicle\-on\_end}$ captured during the vehicle key-off event, such as, as a result of battery being charged during the key-off period. Responsive to the initial detected SOC, $SOC_{next\_vehicle\-on\_start}$ having increased by greater than a predefined amount, the controller may change the mode-flag value to Boolean 1 indicating that the vehicle is operating in the charge depleting mode.

In some instances, while in the charge sustaining mode, the controller may maintain the battery SOC within a range defined by the second maximum sustaining threshold greater than the first maximum sustaining threshold responsive to the engine operating efficiency being greater than an efficiency threshold, e.g., 20%. Additionally or alternatively, the controller may maintain the battery SOC within a range defined by the second maximum sustaining threshold responsive to the present operating efficiency of the engine being greater than estimated operating efficiency of the engine resulting from changing engine operation.

In still other examples, the controller may be configured to compare a total estimated energy of operating the engine at a present high efficiency to charge the battery and to subsequently discharge the battery for propulsion to a total estimated energy of reducing or ending battery charging to operate the engine at a lower efficiency and not having the additional battery energy for later propulsion. Accordingly, responsive to the energy lost at the output of the battery being less than the energy lost due to lowering of the engine efficiency, the controller may operate the engine at a present high efficiency to charge the battery to the second charge sustaining SOC range greater than the first charge sustaining SOC range. In one example, the second charge sustaining SOC range may include an upper (maximum) SOC threshold that is greater than an upper (maximum) SOC threshold associated with the first charge sustaining SOC range.

FIG. 1 illustrates an example power distribution system 100 for a hybrid electric vehicle (hereinafter, vehicle) 102. The vehicle 102 includes one or more electric machines 104 capable of operating as one or both of an electric motor and generator, a traction battery 106, an engine 108, and a multiple-ratio automatic transmission 112. The vehicle 102 further includes a hybrid powertrain controller 110 configured to monitor and control 116 operation of one or more components of the vehicle 102.

The engine 108 and the electric machine 104 are drive sources for the vehicle 102. Although not separately illustrated herein, the engine 108 may, in some instances, be connectable to the electric machine 104 through a disconnect clutch, such that an engine output shaft connectable to a motor input shaft, whereby the engine 108 and the electric machine 104 may be connected in series. The electric machine 104 may be selectively connectable to the engine 108 via, for example, a torque converter.

The transmission 112 is connected to a differential 126 via a corresponding output shaft and drive wheels 114 are connected to the differential 126 through respective axles 128. The driving force applied from the engine 108 and/or the electric machine 104 is transmitted (e.g., through the torque converter and/or the transmission 112) to the drive wheels 114 thereby propelling the vehicle 102. The transmission 112 may include planetary gear sets having a plurality of friction elements selectively engageable to achieve multiple gear ratios. The friction elements may be controllable through a shift schedule that connects and disconnects certain elements of the planetary gear sets to control a ratio between the transmission output torque and the transmission input torque. In one example, the transmission 112 may be automatically shifted from one ratio to another based on the needs of the vehicle 102.

In an example arrangement, the engine 108 may be a primary source of power for the vehicle 102. The engine 108 may be an internal combustion engine, such as a gasoline, diesel, or natural gas-powered engine. The engine 108 generates engine torque that is supplied to the electric machine 104 when the engine 108 and the electric machine 104 are connected with one another. To drive the vehicle 102 with the engine 108, at least a portion of the engine torque passes from the engine 108 to the electric machine 104 and then from the electric machine 104 to the transmission 112.

The traction battery 106 in some arrangements may be another source of propulsion power for the vehicle 102. As described in reference, for example, to FIG. 2B, the traction battery 106 may comprise a plurality of battery cells, e.g., electrochemical cells, electrically connected to a plurality of connectors and switches enabling and disabling the supply and withdrawal of electric energy to and from the battery cells. The plurality of connectors and switches may be electrically operated switches, relays, or other electric, electronic, or electromagnetic components configured to selectively establish, interrupt, or divert current flow between one or more portions of the traction battery 106 and other vehicle components. An example of an electrically controlled switch configured to operate in an HEV is a high voltage contactor.

A battery controller 118 may be configured to monitor and control operation of the traction battery 106. In one example, the battery controller 118 configured to control the plurality of connectors and switches, e.g., contactors, of the traction battery 106. In such an example, the battery controller 118 may command one or more contactors to open or close connecting or disconnecting the traction battery 106 from other vehicle 102 components.

The battery controller 118 may be electrically connected to and in communication with one or more other vehicle controllers, such as, but not limited to, a body controller, a climate control controller, a brake controller, and so on, and may command one or more contactors to open or close in response to receiving a signal from the other vehicle controllers. Additionally or alternatively, the battery controller 118 may be in communication with the hybrid powertrain controller 110 and may command to charge and discharge the traction battery 106 responsive to one or more signals from the hybrid powertrain controller 110. In some examples, the powertrain controller 110, the battery controller 118, and other vehicle controllers may communicate with one another and with other components of the vehicle 102 via one or more in-vehicle networks, such as, but not limited to, one or more of a vehicle controller area network (CAN), an Ethernet network, and a media-oriented system transfer (MOST), as some examples.

The battery controller 118 may be further configured to receive signals from a plurality of vehicle 102 sensors (not illustrated), such as, but not limited to, battery voltage sensor, battery current sensor, battery temperature sensor, ambient temperature sensor, and so on. The battery controller 118 may command to transfer energy to and from the traction battery 106 responsive to receiving a signal from the one or more vehicle sensors. While the traction battery 106 is described as including electrochemical cells, other types of energy storage device implementations, such as capacitors, are also contemplated.

The vehicle 102 may be configured to recharge the traction battery 106 via a connection to a power grid. The vehicle 102 may, for example, cooperate with electric vehicle supply equipment (EVSE) 134 of a charging station to coordinate the charge transfer from the power grid to the traction battery 106. In one example, the EVSE 134 may have a charge connector for plugging into a charging connector 136 of the vehicle 102, such as via connector pins that mate with corresponding recesses of the charging connector 136. The charging connector 136 may be electrically connected to an on-board charger (hereinafter, charger) 138. The charger 138 may condition the power supplied from the EVSE 134 to provide the proper voltage and current levels to the traction battery 106. The charger 138 may be electrically connected to and in communication with the EVSE 134 to coordinate the delivery of power to the vehicle 102.

The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240V AC charging, Level 1 200-450V and 80 amperes (A) DC charging, Level 2 200-450V and up to 200 A DC charging, Level 3 200-450V and up to 400 A DC charging, and so on. Time required to receive a given amount of electric charge may vary among the different charging methods. In some instances, if a single-phase AC charging is used, the traction battery 106 may take several hours to replenish charge. As another example, same amount of charge under similar conditions may be transferred in minutes using other charging methods.

In one example, both the charging connector 136 and the EVSE 134 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, the Chinese GB/T 27930, GB/T 18487.1, GB/T 20234.1, GB/T 20234.2, GB/T 20234.3 and so on. In one example, the recesses of the charging connector 136 may include a plurality of terminals, such that first and second terminals may be configured to transfer power using Levels 1 and 2 AC charging, respectively, and third and fourth terminals may be DC charging terminals and may be configured to transfer power using Levels 1, 2, or 3 DC charging.

Differently arranged connectors having more or fewer terminal are also contemplated. In one example, the charging connector 136 may include terminals configured to establish a ground connection, send and receive control signals to and from the EVSE 134, send or receive proximity detection signals, and so on. A proximity signal may be a signal indicative of a state of engagement between the charging connector 136 of the vehicle 102 and the corresponding connector of the EVSE 134. A control signal may be a low-voltage pulse-width modulation (PWM) signal used to monitor and control the charging process. The charger 138 may be configured to initiate transfer of energy to the vehicle 102 responsive to receiving a corresponding signal from the EVSE 134. In one example, the charger 138 may be configured to initiate charging responsive to a duty cycle of the request signal being greater than a predefined threshold.

The traction battery 106 is electrically connected 124 to the electric machine 104, such that energy stored in the traction battery 106 can be used and/or replenished by the electric machine 104. The connection (illustrated generally as a dotted line) 124 between the traction battery 106 and the electric machine 104 may be a high voltage connection configured to transfer voltages greater than 50 volts (V). In one example, the electric machine 104 may be electrically connected to an inverter (not illustrated) providing bi-directional energy transfer between the electric machine 104 and the traction battery 106. When the electric machine 104 operates in a motor mode, the inverter may convert high voltage direct current (DC) output provided by the traction battery 106 to a three-phase alternating current (AC) as may be required for proper functionality of the electric machine 104. When the electric machine 104 operates in a regenerative mode, the inverter may convert the three-phase AC output from the electric machine 104 acting as a generator to the DC input required by the traction battery 106. In addition to providing energy for propulsion, the traction battery 106 may provide energy for other vehicle electrical components, such as one or more compressors and electric heaters, that operate using voltages greater than 50V.

The traction battery 106 may be configured to provide energy to a low voltage DC supply that is compatible with other electrical loads of the vehicle 102. A DC/DC converter 120 may be connected between a low voltage connection 122 used by one or more low voltage subsystems or components and the high voltage connection 124 used by, for example, the electric machine 104 and the traction battery 106. The high and low voltage connections 124, 122 may be electrical circuit connections that operate to transfer respective amounts of electrical current, withstand respective amounts of voltage differential, and so on, that are different from one another. As one example, the high voltage connection 124 may be configured to transfer electrical current greater than electrical current transferred by the low voltage connection 122. As another example, the high voltage connection 124 may connect to components requiring operating voltage that is greater than operating voltage associated with components connected to the low voltage connection 122.

In some instances, the DC/DC converter 120 may be a bi-directional buck-boost converter configured to convert power flowing to and from the high voltage connection 124 and the low voltage connection 122. For example, in buck mode the DC/DC converter 120 may reduce ("buck") the high voltage DC output of the traction battery 106 to low voltage DC input required by the low voltage connection 122 components. In another example, the DC/DC converter 120 operating in a boost mode may increase ("boost") the low voltage DC output of the low voltage connection 122 components to a high voltage DC input compatible with the traction battery 106.

The battery controller 118 may monitor and control operation of the DC/DC converter 120 and the low voltage subsystems or components, such as activating the converter 120 to charge or discharge the low voltage connection 122 components, activating the low voltage connection 122 components to transfer power to assist propulsion, energize or deenergize the low voltage connection 122 components when the engine 108 is turned off, permit or inhibit activation of the converter 120, and so on. Additionally or alternatively, the DC/DC converter 120 and some or all of the low voltage connection 122 components may be configured to receive command signals from the hybrid powertrain controller 110. In some instances, the low voltage subsystems or components electrically connected with one another and with other portions of the vehicle 102 electrical distribution network via the low voltage connection 122 may be generally referred to as a low voltage bus.

The low voltage bus may be an electrical bus connecting together one or more low voltage connection 122 components, such as, but not limited to, an accessory loads power source 130 and accessory loads 132. The accessory loads power source 130 connected to the low voltage connection 122 may be configured to provide energy to the accessory loads 132, such as, but not limited to, cabin and propulsion system climate control, cabin lighting, vehicle audio system, and so on. Other examples of powering the accessory loads 132 may be powering one or more electrical loads of the vehicle 102 during ignition off and/or engine off states.

Figure 2:
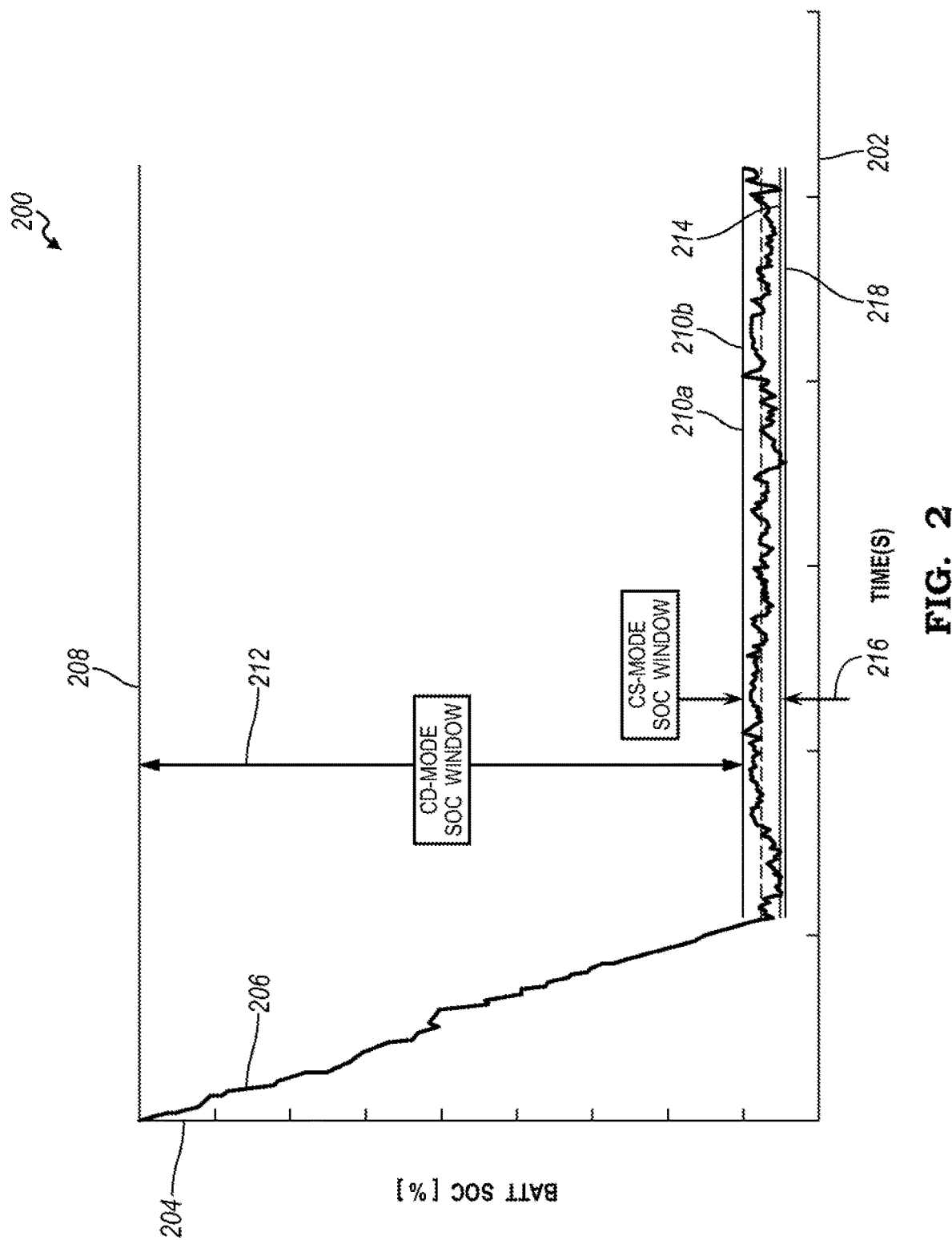
FIG. 2 is a graph illustrating a charge depleting mode and a charge sustaining mode of the vehicle.

FIG. 2 illustrates an example graph 200 for operating modes of the vehicle 102. The graph 200 includes a vertical axis 204 indicative of an SOC of the traction battery 106 and a horizontal axis 202 indicative of time. A curve 206 may be indicative of a change in the SOC of the traction battery 106 with respect to time. One or more operations described in reference to the operation of the vehicle 102 and the change in the SOC of the traction battery 106 with time may be stored as instructions and executed by a corresponding processor of one or both the hybrid powertrain controller 110 and the battery controller 118. Accordingly, while the hybrid powertrain controller 110 and the battery controller 118 may be described as performing a given operation, it is also contemplated that each operation may be performed by the other one of the controllers 110, 118, and/or performed by one or more additional or alternative controllers of the vehicle 102.

The controller 118 may be configured to operate the vehicle 102 and the battery 106 in the charge depleting mode when the traction battery SOC is between an upper (maximum) depleting threshold 208 and a lower (minimum) depleting threshold 210a, where the upper and lower depleting thresholds 208, 210a define a depleting SOC range 212. Further, the controller 118 may operate in the charge sustaining mode when the traction battery SOC is between an upper (maximum) sustaining threshold 210b and a lower (minimum) sustaining threshold 214, where the upper and lower sustaining thresholds 210b, 214 define a sustaining SOC range 216. While the lower depleting threshold 210a is illustrated as being approximately equal to the upper sustaining threshold 210b, such that, upon exiting the charge depleting mode, the vehicle may operate in the charge sustaining mode, the disclosure is not so limited and the SOC ranges corresponding to each of the charge sustaining and depleting modes may overlap, may be larger, smaller, or different SOC ranges and may include larger, smaller or different maxima and minima thresholds.

In some instances, the battery controller 118 may be configured to maintain the SOC of the battery 106 within a range greater than an absolute minimum SOC threshold, $SOC_{min\_abs}$ 218, e.g., by preventing the SOC from falling below the minimum SOC threshold, $SOC_{min\_abs}$ 218. The absolute minimum SOC threshold, $SOC_{min\_abs}$ 218 of a given traction battery may be established according to one or more of manufacturer requirements, battery cells chemistry, battery cell arrangement, and other specifications driven by system design, manufacturing, testing, or validation procedures and results, and so on.

The battery controller 118 may be configured to operate the vehicle 102 in one of a charge depleting mode and a charge sustaining mode. In some instances, operating the vehicle 102 in the charge sustaining mode may include limiting power being output by the traction battery 106 to be less than a predefined power threshold and operating the vehicle 102 in the charge depleting mode may include not limiting the output power of the traction battery 106 such that the battery 106 outputs power greater than the power threshold. While output battery 106 power is described as an example of a difference between operating in the charge depleting and charge sustaining modes, one or more additional or alternative operating criteria, parameters, and values may be evaluated to define each of the charge depleting and charge sustaining modes of the vehicle 102, generally, and of the traction battery 106, specifically.

In one example, the battery controller 118 may set the mode-flag value to Boolean 1 and operate the vehicle 102 in the charge depleting mode responsive to the SOC of the traction battery 106 being greater than a lower depleting threshold 210. In another example, the battery controller 118 may set the mode-flag value to Boolean 0 and operate the vehicle 102 in the charge sustaining mode responsive to the SOC of the traction battery 106 becoming less than the lower depleting threshold 210. In some instances, the battery controller 118 may change between the charge depleting and charge sustaining modes according to a hysteresis, such as by changing the mode-flag value to Boolean 0 indicative of the charge sustaining mode responsive to the SOC of the traction battery 106 falling below a center value 220 of the charge sustaining mode.

Figure 3:
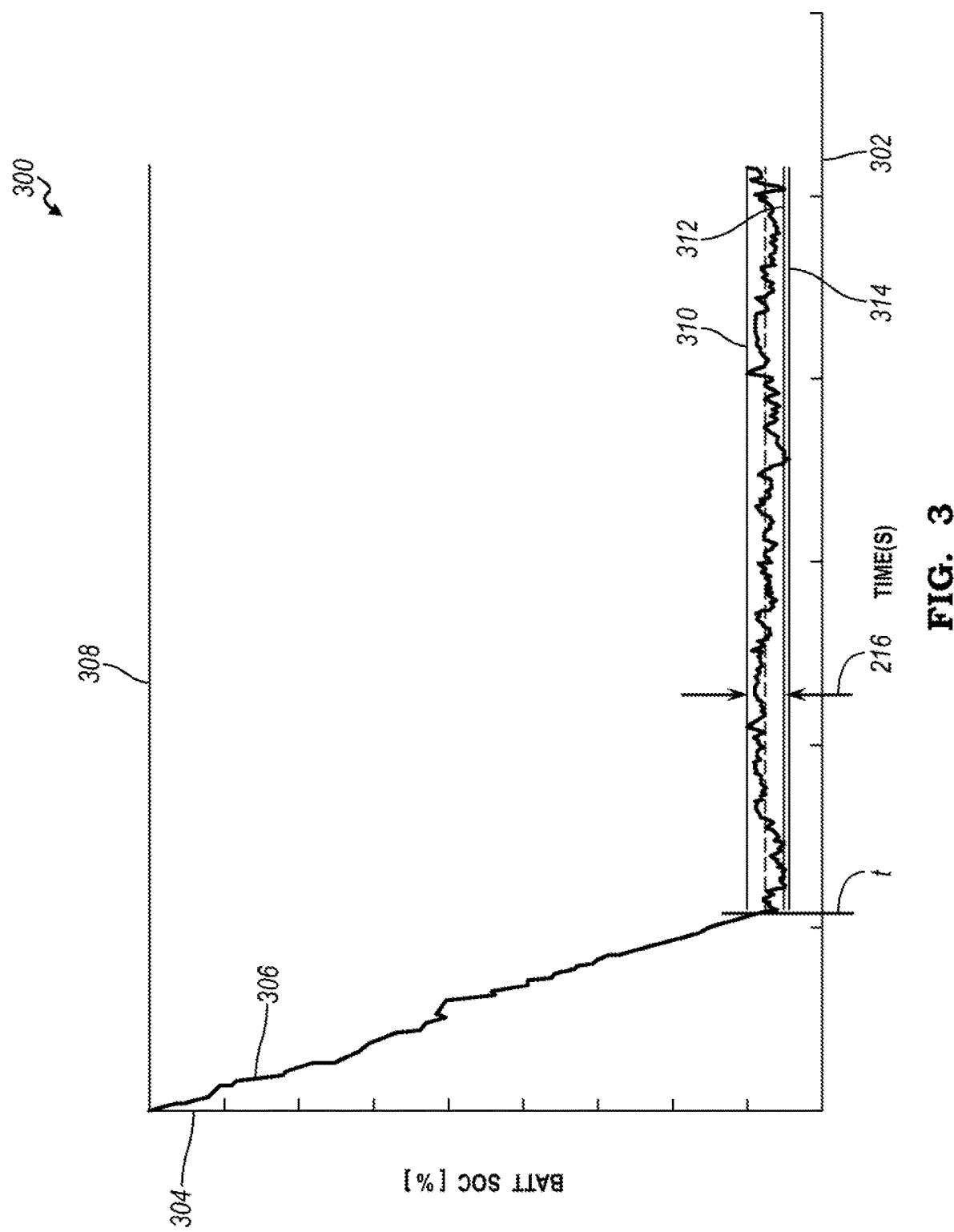
FIG. 3 is a graph illustrating a transition from the depleting mode to the sustaining mode.

FIG. 3 illustrates an example graph 300 for operating modes of the vehicle 102. The graph 300 includes a vertical axis 304 indicative of an SOC of the traction battery 106 and a horizontal axis 302 indicative of time. A curve 306 may be indicative of a change in the SOC of the traction battery 106 with respect to time. As described in reference to at least FIG. 2, one or more operations described in reference to the operation of the vehicle 102 and the change in the SOC of the traction battery 106 with time may be stored as instructions and executed by a corresponding processor of one or both the hybrid powertrain controller 110 and the battery controller 118 and, while the hybrid powertrain controller 110 and the battery controller 118 may be described as performing a given operation, it is also contemplated that each operation may be performed by the other one of the controllers 110, 118, and/or performed by one or more additional or alternative controllers of the vehicle 102.

The controller 118 may be configured to initiate operation of the battery 106 in the charge sustaining mode responsive to the battery SOC falling below a minimum depleting SOC threshold 310, e.g., at, or about, a time t. Upon entering the charge sustaining mode, i.e., setting the mode-flag to Boolean 0 and/or initiating limiting power output by the traction battery 106, the controller 118 may be configured to maintain the SOC of the battery 106 within the sustaining SOC range 216 defined by a first maximum sustaining threshold 310 and a first minimum sustaining threshold 312, where the first minimum sustaining threshold 312 is greater than an absolute minimum SOC threshold 314 of the traction battery 106.

Figure 4:
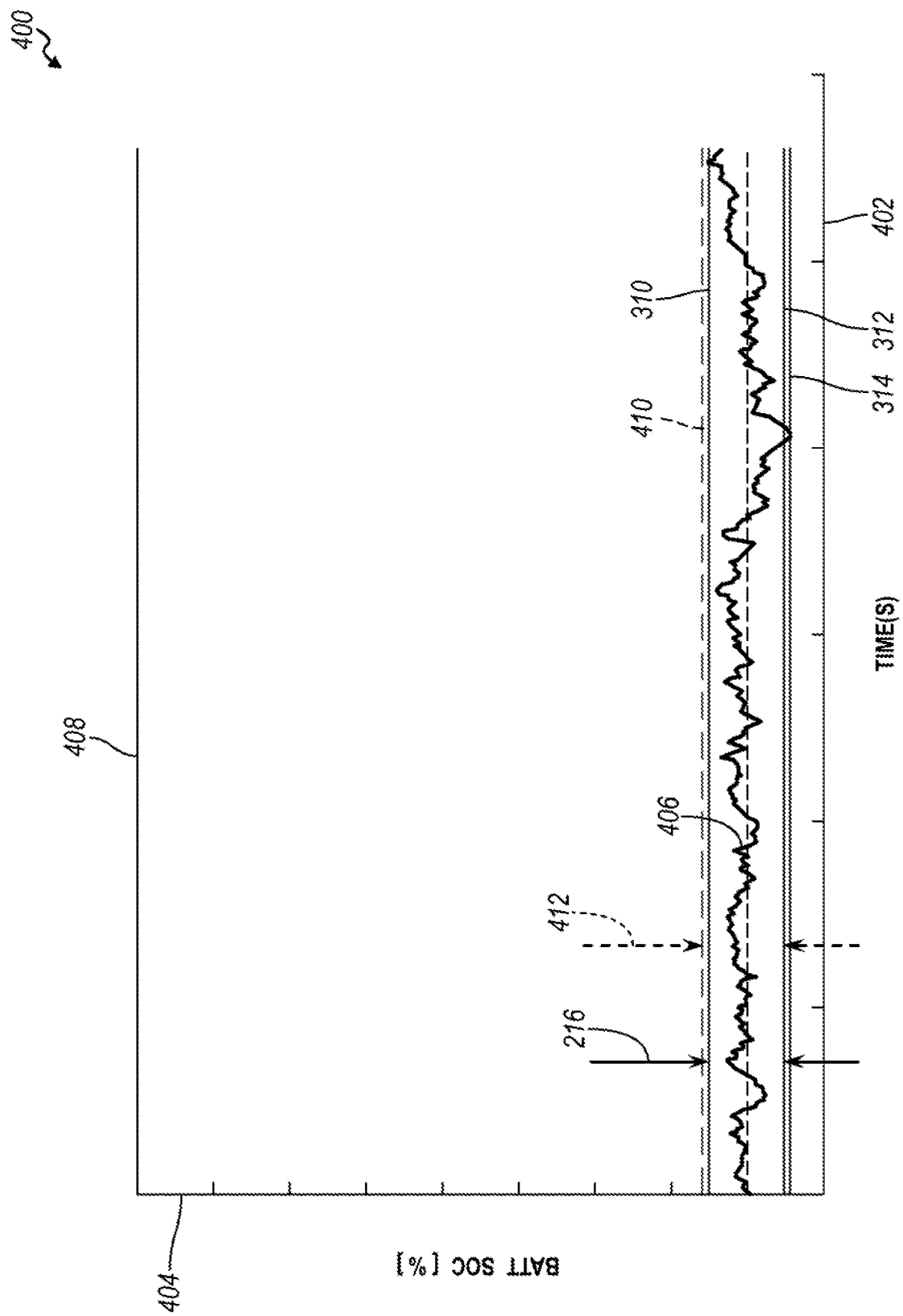
FIG. 4 is a graph illustrating maintaining a state of charge (SOC) of a traction battery within an expanded range.

FIG. 4 illustrates an example graph 400 for operating modes of the vehicle 102. The graph 400 includes a vertical axis 404 indicative of an SOC of the traction battery 106 and a horizontal axis 402 indicative of time. A curve 406 may be indicative of a change in the SOC of the traction battery 106 with respect to time. Upon entering the charge sustaining mode, i.e., setting the mode-flag to Boolean 0 and/or initiating limiting power output by the traction battery 106, the controller 118 may be configured to maintain the SOC of the battery 106 within the sustaining SOC range 216 defined by the first maximum sustaining threshold 310.

In some instances, while in the charge sustaining mode, the controller 118 may maintain the battery SOC within a range defined by a second maximum sustaining threshold 410 greater than the first maximum sustaining threshold 310 responsive to the engine 108 operating efficiency being greater than an efficiency threshold, e.g., 20%. Additionally or alternatively, the controller 118 may maintain the battery SOC within a range defined by the second maximum sustaining threshold 410 responsive to the present operating efficiency of the engine 108 being greater than estimated operating efficiency of the engine 108 resulting from changing engine operation state.

In still other examples, the controller 118 may be configured to compare a total estimated energy of operating the engine 108 at a present high efficiency to charge the battery 106 and to subsequently discharge the battery 106 for propulsion to a total estimated energy of reducing or ending battery charging to operate the engine at a lower efficiency and not having the additional battery energy for later propulsion. Accordingly, responsive to the energy lost at the output of the battery being less than the energy lost due to lowering of the engine efficiency, the controller 118 may operate the engine 108 at a present high efficiency to charge the battery 106 to a second charge sustaining SOC range 412 greater than the first charge sustaining SOC range 216. In one example, the second charge sustaining SOC range 412 may include the second maximum sustaining threshold 410 that is greater than the first maximum sustaining threshold 310 associated with the first charge sustaining SOC range 216.

Figure 5A:
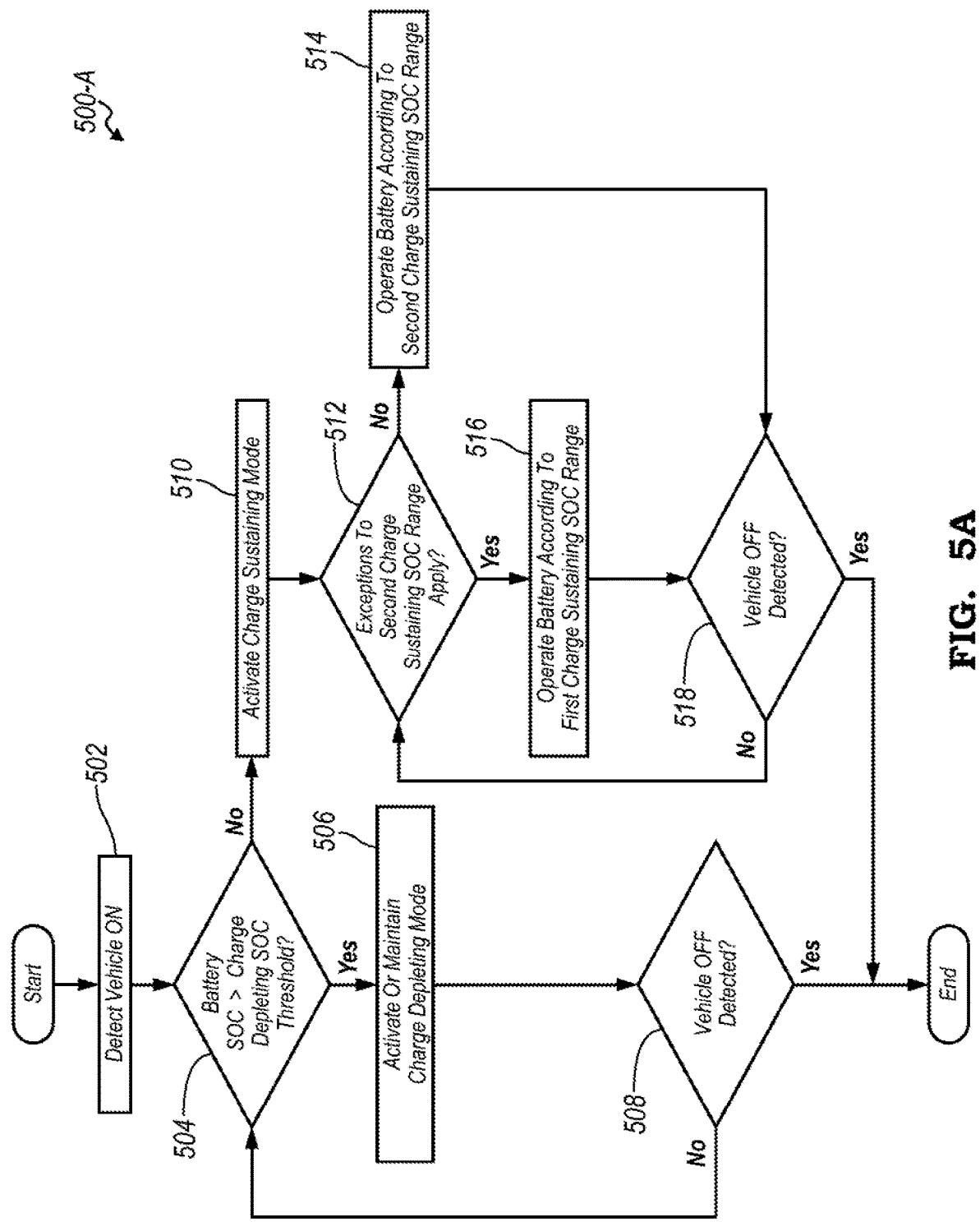
FIGS. 5A and 5B are flowcharts illustrating algorithms for maintaining the SOC within the expanded range.

FIG. 5A illustrates an example process 500-A for operating the vehicle 102 according to one of first and second charge sustaining SOC range. The process 500-A may begin at block 502 where the controller 118 may detect that the vehicle 102 has been turned ON. In some instances, the vehicle ON state may be detected from signals, such as, but not limited to, ignition switch state, engine RPM, wheel speed, and so on. The controller 118, at block 504, may determine whether SOC of the traction battery 106 is greater than a charge depleting SOC threshold. In one example, the controller 118 may compare SOC of the traction battery 106 to an SOC threshold, e.g., 20%, that indicates that the vehicle 102 and/or the traction battery 106 may be operated in the charge depleting mode.

Responsive to traction battery 106 SOC being greater than the charge depleting SOC threshold, the controller 118, at block 506, may operate the traction battery 106 and/or the vehicle 102 in the charge depleting mode. As some non-limiting examples, the charge depleting operating mode may be include operating the traction battery 106 to output a first maximum energy $E_{max\_CD}$, e.g., 6 kilowatt-hours (kW-hr), to meet propulsion and non-propulsion demands of the system, user acceleration, power, and torque demands, and so on.

The controller 118, at block 508, may determine whether the vehicle 102 has been turned OFF. Responsive to the vehicle 102 being turned ON, the controller 118 may return to block 504 where it determines whether the traction battery SOC is greater than the charge depleting SOC threshold. If the vehicle 102 is OFF, the controller 118 may then exit the process 500-A. In some instances, prior to exiting the process 500-A, the controller 118 may latch or store a mode-flag value indicating whether the vehicle 102 is operating in the charge depleting mode (Boolean 1) or the charge sustaining mode (Boolean 0), or perform one or more other operations.

Responsive to traction battery SOC being less than the charge depleting SOC threshold, e.g., less than 20%, the controller 118, at block 510, may operate the traction battery 106 and/or the vehicle 102 in the charge sustaining mode. In one example, the charge sustaining mode operation may include operating the traction battery 106 to output a second maximum energy $E_{max\_CS}$, e.g., 0.4 kW-hr, less than the first maximum energy $E_{max\_CD}$. Battery energy output values given herein are merely examples and are not so limited. In some instances, one or both the first and second maximum energy $E_{max\_CD}$ and $E_{max\_CS}$ may vary due to vehicle operating conditions, user demands, and so on, such that the second maximum output energy $E_{max\_CS}$ is less than the first maximum output energy $E_{max\_CD}$.

At block 512, the controller 118 may determine whether exceptions apply to operating the traction battery 106 in the second charge sustaining SOC range. The exceptions may include vehicle 102 operating conditions, such as, but not limited to, temperatures being less than a temperature threshold and so on. If the excepting operating conditions apply, e.g., operating temperature being less than the temperature threshold, the controller 118, at block 516, may operate the battery 106 according to the first charge sustaining SOC range. For instance, the controller 118 may prevent transfer of energy generated by the engine 108 to the traction battery 106 to charge the battery, thereby, operating the traction battery 106 and the vehicle 102 according to the first charge sustaining SOC range.

Accordingly, responsive to the excepting operating conditions not applying, e.g., temperature being greater than the temperature threshold, the controller 118, at block 514, may operate the traction battery 106 according to the second charge sustaining SOC range. For instance, the controller 118 may transfer of energy generated by the engine 108, or other components of the vehicle 102, to the traction battery 106 to charge the battery 106, thereby, operating the traction battery 106 and the vehicle 102 according to the second charge sustaining SOC range greater than the first charge sustaining SOC range. In one example, the second charge sustaining SOC range may include an upper (maximum) SOC threshold that is greater than an upper (maximum) SOC threshold associated with the first charge sustaining SOC range.

The controller 118, at block 518, may determine whether the vehicle 102 has been turned OFF. Responsive to the vehicle 102 being ON, the controller 118 may return to block 512 where it determines whether exceptions apply to operating the traction battery 106 in the second charge sustaining SOC range. If the vehicle 102 is OFF, the controller 118 may exit the process 500-A. In some instances, prior to exiting the process 500-A, the controller 118 may latch or store a mode-flag value indicating whether the vehicle 102 is operating in the charge depleting mode (Boolean 1) or the charge sustaining mode (Boolean 0), or perform one or more other operations. The process 500-A may then end. In some instances, the process 500-A may be repeated in response to detecting that the vehicle 102 has been turned ON, or in response to detecting another signal or command.

Figure 5B:
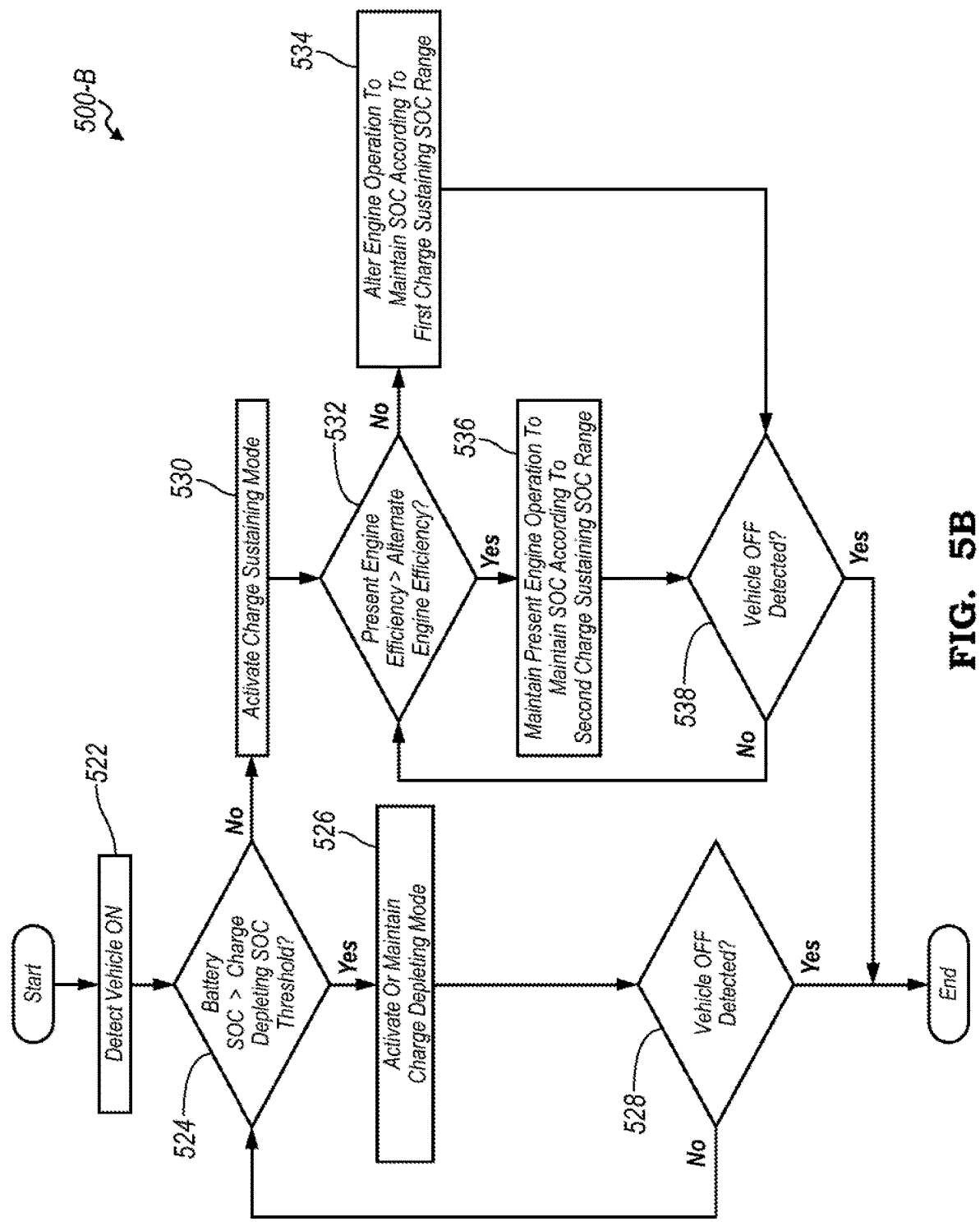

Figure 5B illustrates an example process 500-B for operating the vehicle 102 according to one of first and second charge sustaining SOC range. The process 500-B may begin at block 522 where the controller 118 may detect that the vehicle 102 has been turned ON. In some instances, the vehicle ON state may be detected from signals, such as, but not limited to, ignition switch state, engine RPM, wheel speed, and so on. The controller 118, at block 524, may determine whether SOC of the traction battery 106 is greater than a charge depleting SOC threshold. In one example, the controller 118 may compare SOC of the traction battery 106 to an SOC threshold, e.g., 20%, that indicates that the vehicle 102 and/or the traction battery 106 may be operated in the charge depleting mode.

Responsive to traction battery 106 SOC being greater than the charge depleting SOC threshold, the controller 118, at block 526, may operate the traction battery 106 and/or the vehicle 102 in the charge depleting mode. As some non-limiting examples, the charge depleting operating mode may be include operating the traction battery 106 to output a first maximum energy $E_{max\_CD}$, e.g., 6 kilowatt-hours (kW-hr), to meet propulsion and non-propulsion demands of the system, user acceleration, power, and torque demands, and so on.

The controller 118, at block 528, may determine whether the vehicle 102 has been turned OFF. Responsive to the vehicle 102 being turned ON, the controller 118 may return to block 524 where it determines whether the traction battery SOC is greater than the charge depleting SOC threshold. If the vehicle 102 is OFF, the controller 118 may then exit the process 500-B. In some instances, prior to exiting the process 500-B, the controller 118 may latch or store a mode-flag value indicating whether the vehicle 102 is operating in the charge depleting mode (Boolean 1) or the charge sustaining mode (Boolean 0), or perform one or more other operations.

Responsive to traction battery SOC being less than the charge depleting SOC threshold, e.g., less than 20%, the controller 118, at block 530, may operate the traction battery 106 and/or the vehicle 102 in the charge sustaining mode. In one example, the charge sustaining mode operation may include operating the traction battery 106 to output a second maximum energy $E_{max\_CS}$, e.g., 0.4 kW-hr, less than the first maximum energy $E_{max\_CD}$. Battery energy output values given herein are merely examples and are not so limited. In some instances, one or both the first and second maximum energy $E_{max\_CD}$ and $E_{max\_CS}$ may vary due to vehicle operating conditions, user demands, and so on, such that the second maximum output energy $E_{max\_CS}$ is less than the first maximum output energy $E_{max\_CD}$.

At block 532, the controller 118 may compare a present efficiency of the engine 108 under current operating conditions and an alternate efficiency of the engine 108, i.e., efficiency resulting from altering operation of the engine 108. Responsive to the present efficiency of the engine 108 being less than the alternate efficiency, the controller 118, at block 534, may alter operation of the engine 108. For instance, the controller 118 may prevent transfer of energy generated by the engine 108 to the traction battery 106 to charge the battery, thereby, operating the traction battery 106 and the vehicle 102 according to the first charge sustaining SOC range.

Accordingly, responsive to a present efficiency of the engine 108 under current operating conditions being greater than an alternate efficiency of the engine 108, i.e., efficiency resulting from altering operation of the engine 108, the controller 118, at block 536, may maintain current operation of the engine 108. For instance, the controller 118 may transfer of energy generated by the engine 108 to the traction battery 106 to charge the battery 106, thereby, operating the traction battery 106 and the vehicle 102 according to the second charge sustaining SOC range greater than the first charge sustaining SOC range. In one example, the second charge sustaining SOC range may include an upper (maximum) SOC threshold that is greater than an upper (maximum) SOC threshold associated with the first charge sustaining SOC range.

While at block 532, the controller 118 is described as comparing a present and alternate efficiencies, other implementations are also contemplated. As one example, the controller 118 may compare a total estimated energy of operating the engine 108 at a present high efficiency to charge the battery 106 and to subsequently discharge the battery 106 for propulsion to a total estimated energy to reduce or terminate battery charging to operate the engine 108 at a lower efficiency and not having the additional battery 106 energy for later propulsion. If lowering engine operation efficiency results in smaller energy losses than maintaining operation of the engine at a present efficiency, the controller 118 may change (lower) operating efficiency of the engine 108. For instance, the controller 118 may prevent transfer of energy generated by the engine 108 to the traction battery 106 to charge the battery, thereby, operating the traction battery 106 and the vehicle 102 according to the first charge sustaining SOC range.

As another example, responsive to estimated lower efficiency engine operation resulting in greater energy losses than maintaining operation of the engine 108 at a present efficiency, the controller 118, may maintain operating efficiency of the engine 108. For instance, the controller 118 may transfer of energy generated by the engine 108 to the traction battery 106 to charge the battery 106, thereby, operating the traction battery 106 and the vehicle 102 according to the second charge sustaining SOC range greater than the first charge sustaining SOC range. In one example, the second charge sustaining SOC range may include an upper (maximum) SOC threshold that is greater than an upper (maximum) SOC threshold associated with the first charge sustaining SOC range.

The controller 118, at block 538, may determine whether the vehicle 102 has been turned OFF. Responsive to the vehicle 102 being ON, the controller 118 may return to block 532 where it compares an efficiency of the engine 108 under current operation and an alternate efficiency of the engine 108, i.e., efficiency resulting from altering operation of the engine 108. If the vehicle 102 is OFF, the controller 118 may exit the process 500-B. In some instances, prior to exiting the process 500-B, the controller 118 may latch or store a mode-flag value indicating whether the vehicle 102 is operating in the charge depleting mode (Boolean 1) or the charge sustaining mode (Boolean 0), or perform one or more other operations. The process 500-B may then end. In some instances, the process 500-B may be repeated in response to detecting that the vehicle 102 has been turned ON, or in response to detecting another signal or command.

Figure 6:
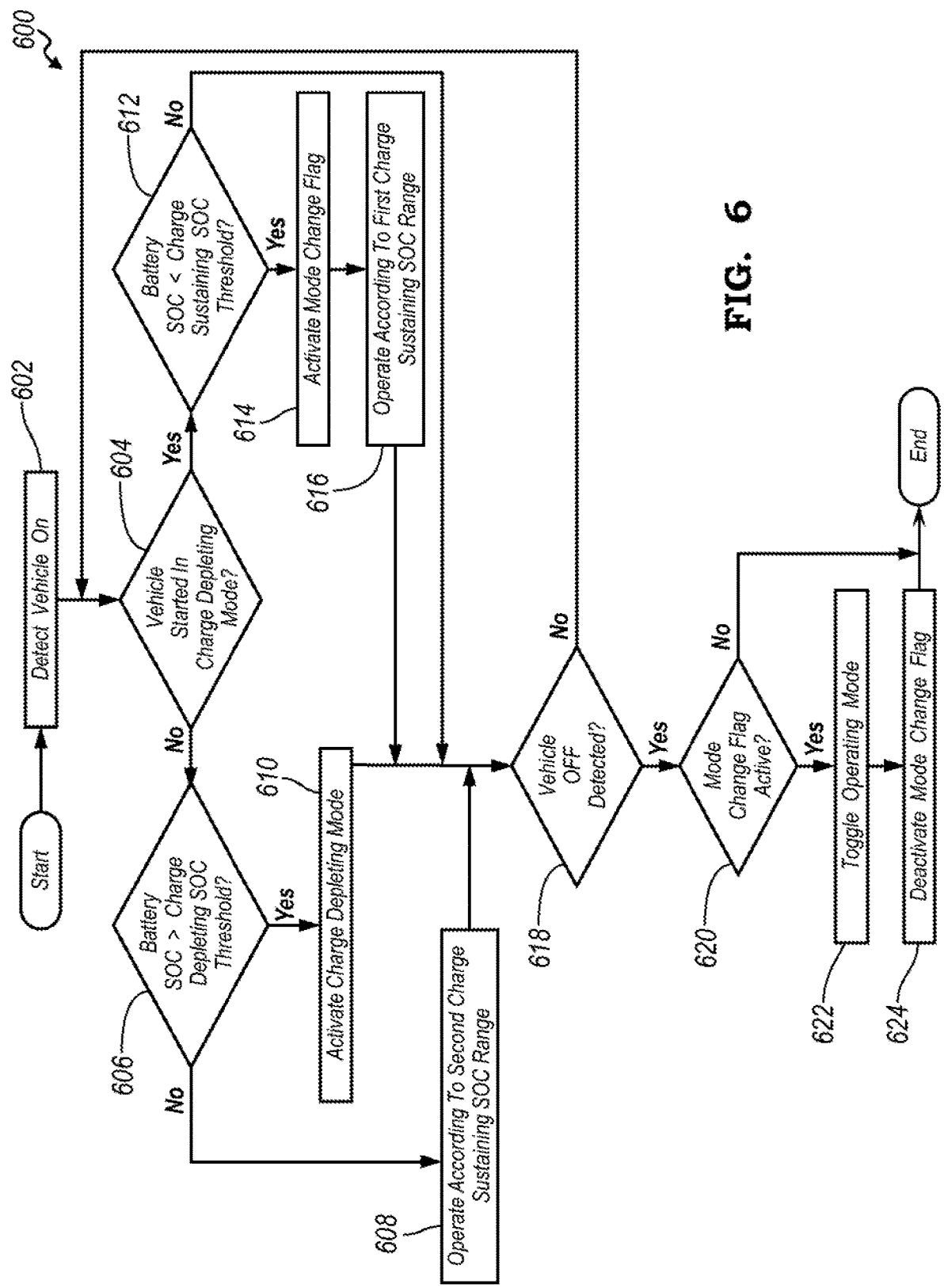
FIG. 6 is a flowchart illustrating another algorithm for maintaining the SOC within the expanded range.

FIG. 6 illustrates an example process 600 for operating the vehicle 102 according to one of the first and second charge sustaining SOC ranges. The process 600 may begin at block 602 where the controller 118 may detect that the vehicle 102 has been turned ON based on ignition switch state, engine RPM, wheel speed, and so on. The controller 118, at block 604, may determine whether the vehicle 102 and/or the traction battery 106 has been started in the charge depleting mode. In some instances, the controller 118 may analyze Boolean value associated with the mode-flag, where Boolean 1 value indicates operation in the charge depleting mode or Boolean 0 value indicates operation in the charge sustaining mode and so on.

Responsive to the vehicle 102 being started in the charge sustaining mode, the controller 118, at block 606, may determine whether SOC of the traction battery 106 is greater than the charge depleting SOC threshold. In one example, the controller 118 may compare SOC of the traction battery 106 to an SOC threshold, e.g., 20%, that indicates that the vehicle 102 and/or the traction battery 106 may be operated in the charge depleting mode. Responsive to traction battery SOC being less than the charge depleting SOC threshold, e.g., less than 20%, the controller 118, at block 608, may operate the traction battery 106 and/or the vehicle 102 in the charge sustaining mode according to the second charge sustaining SOC range greater than the first charge sustaining SOC range. In one example, the second charge sustaining SOC range may include an upper (maximum) SOC threshold that is greater than an upper (maximum) SOC threshold associated with the first charge sustaining SOC range.

Responsive to traction battery 106 SOC being greater than the charge depleting SOC threshold, the controller 118, at block 610, may operate the traction battery 106 and/or the vehicle 102 in the charge depleting mode. As some non-limiting examples, the charge depleting operating mode may be include operating the traction battery 106 to output the first maximum energy $E_{max\_CD}$, e.g., 6 kilowatt-hours (kW-hr), greater than the second maximum energy $E_{max\_CD}$ to meet propulsion and non-propulsion demands of the system, user acceleration, power, and torque demands. The controller 118 may then proceed to block 618 where it may determine whether the vehicle 102 has been turned OFF.

Responsive to the vehicle 102 being started in the charge depleting mode, the controller 118 may, at block 612, determine whether SOC of the traction battery 106 is less than the upper (maximum) charge sustaining SOC threshold. In one example, the controller 118 may compare SOC of the traction battery 106 to an SOC threshold, e.g., 20%, that indicates whether the vehicle 102 and/or the traction battery 106 may be operated in the charge depleting or charge sustaining mode. If the battery SOC is greater than the upper (maximum) charge sustaining SOC threshold, the controller 118 may then proceed to block 618 where it may determine whether the vehicle 102 has been turned OFF.

Responsive to traction battery SOC being less than the upper (maximum) charge sustaining SOC threshold, e.g., less than 20%, the controller 118, at block 614, may activate a mode-change flag. In one example, the controller 118 may set Boolean value associated with the mode-change flag equal to Boolean 1 indicating that the mode-change flag is active. The controller 118, at block 616, may operate the traction battery 106 and/or the vehicle 102 in the charge sustaining mode according to the first charge sustaining SOC range less than the second charge sustaining SOC range. In one example, the second charge sustaining SOC range may include an upper (maximum) SOC threshold that is greater than an upper (maximum) SOC threshold associated with the first charge sustaining SOC range. The controller 118 may then proceed to block 618 where it may determine whether the vehicle 102 has been turned OFF.

Responsive to the vehicle 102 being turned ON, the controller 118 may return to block 604 where it determines whether the vehicle 102 and/or the traction battery 106 is operating in the charge depleting mode. If the vehicle 102 is OFF, the controller 118 may determine, at block 620, whether a mode-change flag is active. In one example, the controller 118 may analyze Boolean value associated with the mode-change flag, where Boolean 1 value indicates that the mode-change flag is active and Boolean 0 value indicates that the mode-change flag is inactive. If the mode-change flag is inactive, the controller 118 may then exit the process 600. In some instances, prior to exiting the process 600, the controller 118 may latch or store a mode flag value indicating whether the vehicle 102 is operating in the charge depleting mode (Boolean 1) or the charge sustaining mode (Boolean 0), or perform one or more other operations.

If the mode-change flag is active, the controller 118, at block 622, may toggle Boolean value associated with the operating mode-flag. The controller 118 may deactivate, at block 624, the mode-change flag, e.g., set value of the mode-change flag equal to Boolean 0, responsive to the toggling of the value of the mode-flag. The controller 118 may then exit the process 600, including following latching or storing a mode flag value indicating whether the vehicle 102 is operating in the charge depleting mode (Boolean 1) or the charge sustaining mode (Boolean 0), or performing one or more other operations. The process 600 may then end. In some instances, the process 600 may be repeated in response to detecting that the vehicle 102 has been turned ON, or in response to detecting another signal or command.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A vehicle comprising:
a traction battery; and
a controller configured to,
responsive to a transition from deplete mode to sustain mode during a first drive cycle, maintain a state of charge (SOC) of the battery within a range defined by a first maximum threshold,
responsive to initiation of a next drive cycle in the sustain mode and a temperature being greater than a threshold, maintain the SOC within a range defined by a second maximum threshold greater than the first maximum threshold, and responsive to initiation of the next drive cycle in the sustain mode and the temperature being less than the threshold, maintain the SOC within the range defined by the first maximum threshold.

2. The vehicle of claim 1, wherein the controller is further configured to prevent a transition from the sustain mode to the deplete mode when the SOC is greater than the first maximum threshold.

3. The vehicle of claim 1, wherein the deplete mode includes output power of the battery being greater than a power threshold and the sustain mode includes the output power being less than the power threshold.

4. The vehicle of claim 1, wherein the maintaining the SOC of the battery within the range defined by the first maximum threshold includes using power output by an engine.

5. The vehicle of claim 4, wherein the maintaining the SOC within the range defined by the second maximum threshold is further responsive to a difference between an efficiency of the engine in a present operating state and an estimated efficiency of the engine in another operating state being greater than a difference threshold.

6. A method comprising:
   by a controller,
      responsive to a transition from deplete mode to sustain mode during a first drive cycle, maintaining a state of charge (SOC) of a traction battery within a range defined by a first maximum threshold,
      responsive to initiation of a next drive cycle in the sustain mode and a temperature being greater than a threshold, maintaining the SOC within a range defined by a second maximum threshold greater than the first maximum threshold, and
      responsive to initiation of the next drive cycle in the sustain mode and the temperature being less than the threshold, maintain the SOC within the range defined by the first maximum threshold.

7. The method of claim 6 further comprising preventing a transition from the sustain mode to the deplete mode when the SOC is greater than the first maximum threshold.

8. The method of claim 6, wherein the deplete mode includes output power of the battery being greater than a power threshold and the sustain mode includes the output power being less than the power threshold.

9. The method of claim 6, wherein the maintaining the SOC of the battery within the range defined by the first maximum threshold includes charging the battery using power output by an engine.

10. The method of claim 9, wherein the maintaining the SOC within the range defined by the second maximum threshold is further responsive to a difference between an efficiency of the engine in a present operating state and an estimated efficiency of the engine in another operating state being greater than a difference threshold.

\* \* \* \* \*